United States Patent [19]

Patel et al.

[11] Patent Number: 5,116,625
[45] Date of Patent: May 26, 1992

[54] NITROGEN SPARGING METHOD FOR ELIMINATING OFF-NOTES FROM MINT FLAVORS AND METHOD OF MAKING CHEWING GUM COMPRISING SAID FLAVORS

[75] Inventors: Mansukh M. Patel, Downers Grove; Charles M. Copper, Westmont, both of Ill.

[73] Assignee: Wm. Wrigley Jr. Company, Chicago, Ill.

[21] Appl. No.: 634,064

[22] Filed: Dec. 26, 1990

[51] Int. Cl.$^5$ .................. A23G 3/30; A23L 1/015
[52] U.S. Cl. ..................... 426/3; 426/475; 426/487; 426/651
[58] Field of Search ............. 426/475, 487, 651, 3-6; 424/58

[56] References Cited

U.S. PATENT DOCUMENTS

| | | | |
|---|---|---|---|
| 2,641,550 | 6/1953 | Dykstra | 426/475 |
| 3,105,763 | 10/1963 | North et al. | 426/400 |
| 3,997,685 | 12/1976 | Strobel | 426/594 |
| 4,150,677 | 4/1979 | Osborne, Jr. et al. | 131/8 R |
| 4,259,360 | 3/1981 | Venetucci et al. | 426/475 |
| 4,279,937 | 7/1981 | Strobel et al. | 426/424 |
| 4,476,142 | 10/1984 | Netherwood et al. | 426/651 |
| 4,647,466 | 3/1987 | Japikse et al. | 426/475 |
| 4,766,001 | 8/1988 | Mizandjian et al. | 426/475 |
| 4,888,196 | 12/1989 | Ehrman et al. | 426/601 |
| 4,973,485 | 11/1990 | Rich | 426/651 |
| 5,030,459 | 7/1991 | Barcelon et al. | 426/651 |

FOREIGN PATENT DOCUMENTS 0014340 8/1980 Fed. Rep. of Germany ...... 426/475

OTHER PUBLICATIONS

FSTA (82: 16258) DN 82-11-RO739, Abstracting "Usefulness of ethanol as a quality index of fish and fish products", in Bulletin of the Tokai Regional Fisheries Research Laboratory (1981) No. 104, 83-90.

*Primary Examiner*—Donald E. Czaja
*Assistant Examiner*—J. Aberle
*Attorney, Agent, or Firm*—Willian Brinks Olds Hofer Gilson & Lione

[57] ABSTRACT

A method of sparging off-notes from mint flavors using nitrogen is provided. The method comprises passing nitrogen through a mint flavor for a sufficient time at sufficient pressure until off-notes are eliminated. A method of preparing oral compositions, including chewing gum, comprising nitrogen sparged mint flavor is also provided.

3 Claims, No Drawings

NITROGEN SPARGING METHOD FOR ELIMINATING OFF-NOTES FROM MINT FLAVORS AND METHOD OF MAKING CHEWING GUM COMPRISING SAID FLAVORS

BACKGROUND OF THE INVENTION

The present invention relates to a method of sparging off-notes in mint flavors using nitrogen. More particularly, the present invention relates to a method of adding nitrogen sparged mint flavors to oral compositions, including chewing gum.

Mint flavors utilized in oral compositions may manifest undesirable, volatile off-notes. These off-notes are often characterized as being harsh and acid-like and producing an unpleasant aroma. Examples of such off-notes include dimethyl sulfide, isobutanol, and isovaleraldehyde.

Volatile off-notes in mint flavors have previously been eliminated by various techniques, including vacuum distillation. This method, however, is not easily controllable and is labor and technology intensive. Methods which utilize heat to eliminate off-notes volatilize desirable flavor components, speed up oxidation reactions, and may ultimately damage favorable properties of the flavor.

SUMMARY OF THE INVENTION

One embodiment of the present invention is a method of sparging undesirable off-notes from mint flavors using nitrogen. The method generally comprises passing nitrogen gas through mint flavors for a sufficient time and at sufficient pressure until off-notes are eliminated from the flavor.

Another embodiment of the present invention is a method of adding nitrogen sparged mint flavors to oral compositions, including chewing gum.

A further embodiment of the present invention is a chewing gum composition comprising a nitrogen sparged mint flavor.

The present invention is advantageous in that it eliminates undesirable off-notes associated with mint flavors without adversely affecting the flavor. The elimination of off-notes renders the flavor more acceptable sensorially, improving aroma and other flavor properties. These advantages are provided by a relatively simple, quick, and inexpensive method. In particular, the present invention can be carried out in a controlled fashion, using simple and inexpensive equipment without the use of heat. The present invention is also well suited for both small and large batch processing.

The above-described advantages of the present invention, as well as others, will become apparent from the following description which discloses presently preferred embodiments of the present invention.

DETAILED DESCRIPTION OF THE PREFERRED EMBODIMENTS

The present invention is a method for nitrogen sparging mint flavors to eliminate undesirable, volatile off-notes associated with such flavors. In summary, the method involves passing nitrogen gas through a mint flavor under pressurized conditions. The nitrogen is bubbled through the flavor for a sufficient time until off-notes are detectably absent from the flavor.

More particularly, a sparger is installed in a stainless steel vessel equipped with an agitator. The vessel may range from about 1 gallon to about 3000 gallons in size. Preferably, the sparger is placed inside the vessel or tank through a tank nozzle in the top of the tank. A nitrogen cylinder, equipped with a pressure regulator and shut-off valve, is connected to the sparge.

The mint flavor is added directly to the tank. In a most preferred embodiment, the mint flavor is spearmint oil, peppermint oil, or oil of wintergreen. The amount of mint flavor added will vary depending on the size of the tank. For example, approximately 600 pounds of mint flavor may be added to a 120-gallon tank.

The agitator in the tank is then turned on. The mint flavor is agitated throughout the sparging process. Next, the outlet valve of the nitrogen cylinder is opened and the pressure adjusted. Preferably, the nitrogen is passed through the mint flavor at about 1.5 psi to about 20 psi. Generally, small bubbles of nitrogen, with a resulting greater surface area, will remove more off-notes as will a greater total volume of nitrogen gas passed through the flavor.

The nitrogen is allowed to bubble through the mint flavor until the endpoint is reached, i.e., until volatile off-notes are detectably eliminated from the flavor. Samples are removed from the tank at various time intervals to determine quantities of off-notes still present in the mint flavor. Samples may be analyzed by gas chromatography/mass spectroscopy methods or by direct sensory methods.

During sparging, small molecular weight components come off the flavor first. Examples of such components present in mint flavors include 2-methyl butanal, isovaleraldehyde, isobutanol, and dimethyl sulfide. The length of time required to sparge off-notes from the flavor will vary and will depend upon various factors. These factors include but are not limited to the temperature of the mint flavor, the initial concentration of off-notes in the mint flavor, surface area of nitrogen used during sparging, and the batch size of mint flavor. All these factors affecting sparging time are known to those skilled in the art. When sparging is complete and the off-notes are eliminated, the nitrogen cylinder valve is turned off, and the mint flavor removed from the tank.

The nitrogen sparged mint flavor is then ready for incorporation into oral compositions. Preferably, the nitrogen sparged mint flavor is added to a chewing gum formulation. The sparged flavor is generally added to the gum formulation late in the mixing process. Optimum levels of nitrogen sparged mint flavor may vary from about 0.1% to about 5% in a chewing gum formulation. Preferably, the level of flavor added is about 0.5% to about 1.5%.

In general, a chewing gum comprises a water-soluble bulk portion, a water-insoluble chewable gum base portion and typically, water-insoluble flavor ingredients. The water-soluble portion dissipates with a portion of the flavor over time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber, as well as natural latexes such as chicle. Resins include polyvinyl acetate and terpene resins. Fats and oils may also be included in the gum base including tallow, hydrogenated and partially hydrogenated vegetable oils and cocoa butter. Commonly employed waxes include paraffin, microcrystalline, and natural waxes such as beeswax and carnauba. The insoluble gum base constitutes between about 5% to about 95% of the gum, and more preferably, about 20% to about 30%.

The gum base typically also includes a filler component. The filler component may be calcium carbonate, magnesium carbonate, talc, dicalcium phosphate, and the like. The filler may constitute between about 5% to about 60% of the gum base. Preferably, the filler comprises about 5% to about 50% of the chewing gum base. The gum base also contains softeners, including glycerol monostearate and glycerol triacetate. Further, gum bases may also contain additional ingredients such as anti-oxidants, colors, and emulsifiers. The present invention contemplates using any commercially acceptable gum base.

The water-soluble portion of chewing gum may further comprise softeners, sweeteners, and flavors and combinations thereof. The softeners are added to the chewing gum in order to optimize the chewing ability and mouth feel of the gum. Softeners, also known in the art as plasticizers, generally constitute about 0.1% to about 15% of the chewing gum. Softeners contemplated by the present invention include glycerin, lecithin and combinations thereof. Aqueous sweetener solutions such as those containing sorbitol, hydrogenated starch hydrolysates, corn syrup, and combinations thereof may be used as softeners and binding agents in gum.

Sweeteners contemplated by the present invention for use in chewing gum include both sugar and sugarless components. Sugar sweeteners generally include saccharide-containing components commonly known in the art and include, but are not limited to, sucrose, dextrose, maltose, dextrin, dried invert sugar, fructose, levulose, galactose, corn syrup solids and the like, alone or in any combination. Sugarless sweeteners include components with sweetening characteristics but are devoid of the commonly known sugars and comprise, but are not limited to, sugar alcohols such as sorbitol, mannitol, xylitol, hydrogenated starch hydrolysates, maltitol, and the like, alone, or in any combination. Also contemplated for direct addition to the gum are high intensity sweeteners such as aspartame, Sucralose ®, cyclamate, acesulfame-K, dihydrochalones, alitame, and saccharin.

Those persons skilled in the art will recognize that any combination of sugar/sugarless sweeteners may be employed in the chewing gum. Further, those skilled in the art will recognize a sweetener may be present in a chewing gum in whole or in part as a water-soluble bulking agent, and that the softener may be combined with a sweetener such as an aqueous sweetener solution.

The nitrogen sparged mint flavor may be added to the chewing gum in an amount from about 0.1% to about 5% and preferably from about 0.5% to about 1.5% of the gum. Flavors contemplated by the present invention include mint flavors such as spearmint oil, peppermint oil, and oil of wintergreen, or blends thereof. The nitrogen sparged mint flavor may be blended with other flavors such as essential oils, synthetic flavors, or mixtures thereof, including but not limited to, oils derived from plants and fruits such as citrus oils, fruit essences, clove oil, anise, and the like. Artificial flavoring components are also contemplated. Those skilled in the art will recognize that natural and artificial flavoring agents may be combined in any sensorially acceptable blend. All such flavors and flavor blends are contemplated by the present invention.

Ingredients such as colors, emulsifiers, and pharmaceutical agents may be added to the chewing gum.

In general, chewing gum is manufactured by sequentially adding the various chewing gum ingredients to any commercially available mixer known in the art. After the ingredients have been thoroughly mixed, the gum mass is discharged from the mixer and shaped into the desired forms such as by rolling into sheets and cutting into sticks, extruding into chunks, or casting into pellets. Generally, the ingredients are mixed by first melting the gum base and adding it to the running mixer. The base may also be melted in the mixer itself. Color may also be added at this time. A softener such as glycerin may then be added next along with the syrup and a portion of the bulking agent. Further portions of the bulking agents may be added to the mixer. Preferably, the nitrogen sparged mint flavor ingredients are added to the gum mixture near the end of the mixing process. The entire mixing procedure takes from about 5 minutes to 15 minutes, however, longer mixing times may be required. Those persons skilled in the art will recognize that many variations of the above-described procedure may be followed.

In another embodiment of the present invention, the nitrogen sparged mint flavor may be added to oral compositions such as mouthwash, toothpaste, pressed mints, hard candies, both sugar and sugarless, and beverages. Preferably, the nitrogen sparged mint flavor comprises about 0.01% to about 2% of the oral composition.

EXAMPLE 1

Nitrogen Sparging of Spearmint Oil

Approximately 600 pounds of spearmint oil was added to a 300 gallon covered stainless steel vessel. Nitrogen was passed through a ¼" copper tube into the flavor at 8.5 psi. While the nitrogen was passed through the flavor, the flavor was agitated with a Lightning mixer.

The flavor was sparged for 7 hours, using one nitrogen tank. Then, another nitrogen tank was connected to the vessel so that two lines of nitrogen passed through the flavor. Samples of the flavor, were taken at various time intervals and analyzed by gas chromatography/mass spectroscopy. The results are shown below in Table 1.

TABLE 1

| Time (Hrs.) | % Dimethyl Sulfide | % Iso-butanol | % Isovaler-aldehyde | % 2-Methyl butanal |
|---|---|---|---|---|
| $T_0$ | 100.00 | 100.00 | 100.00 | 100.00 |
| $T_4$ | 39.31 | 69.21 | 98.52 | 97.60 |
| $T_7$ | 6.75 | 63.42 | 93.70 | 89.70 |
| $T_{10}$ | — | 23.75 | 63.99 | 64.90 |

At ten hours of sparging, detectable aroma changes occurred in the flavor. As shown in Table 1, dimethyl sulfide was eliminated from the mint flavor after 10 hours of sparging. The percentages of the other off-notes were also markedly reduced after 10 hours of sparging, isobutanol being reduced to 23.75% in the spearmint oil.

EXAMPLE 2

Preparing a Chewing Gum Containing a Nitrogen Sparged Mint Flavor

A nitrogen sparged mint flavor, including the sparged spearmint oil described in Example 1, may be added to a chewing gum formulation such as that described below:

| Ingredient | % by Weight |
|---|---|
| Sugar | 54.3 |
| Base | 20.0 |
| Corn Syrup | 13.0 |
| Glycerin | 2.0 |
| Nitrogen Sparged Mint Flavor | 0.7 |
| Dextrose | 10.0 |
| | 100.0% |

The amount of nitrogen sparged mint flavor added to a chewing gum formulation may vary. The precise chewing gum formulation employed is not critical to the present invention.

In summary, a relatively simple and inexpensive method has been described for eliminating undesirable off-notes from mint flavors. Although specific embodiments and examples have been described herein, it should be born in mind that these have been provided by way of explanation and illustration and that the present invention is not limited thereby. Modifications which are within the ordinary skill in the art to make are considered to lie within the scope of the invention as defined by the following claims, including all equivalents.

We claim:

1. A method of eliminating off-notes from mint flavors by nitrogen sparging, comprising:
    providing a mint flavor selected from the group consisting of spearmint oil, peppermint oil, and oil of wintergreen; and
    passing nitrogen through said flavor for sufficient time at sufficient pressure to eliminate undesirable off-notes contained therein.

2. A method of preparing a chewing gum containing nitrogen sparged mint flavor comprising the following steps:
    providing gum ingredients, comprising gum base, softener, and sweetener ingredients;
    providing a mint flavor selected from the group consisting of spearmint oil, peppermint oil, and oil of wintergreen;
    passing nitrogen through said flavor for a sufficient time at sufficient pressure to eliminate undesirable off-notes contained therein; and
    mixing the nitrogen sparged mint flavor with the chewing gum ingredients so that the said flavor comprises about 0.1% to about 1.5% by weight of the chewing gum.

3. The method of claim 2, wherein said mint flavor comprises about 0.5% to about 1.5% by weight of the chewing gum.

* * * * *

UNITED STATES PATENT AND TRADEMARK OFFICE
CERTIFICATE OF CORRECTION

PATENT NO. : 5,116,625
DATED : May 26, 1992
INVENTOR(S) : Mansukh M. Patel et al.

It is certified that error appears in the above-identified patent and that said Letters Patent is hereby corrected as shown below:

column 4, line 43, after the second occurrence of "flavor" please delete ",".

Signed and Sealed this

Seventh Day of September, 1993

Attest:

BRUCE LEHMAN

Attesting Officer

Commissioner of Patents and Trademarks